United States Patent [19]
Silverbrook et al.

[11] Patent Number: 5,805,136
[45] Date of Patent: Sep. 8, 1998

[54] INTERMINGLING SUBPIXELS IN DISCRETE LEVEL DISPLAYS

[75] Inventors: Kia Silverbrook, Leichhardt, Australia; William Clark Naylor, Jr., Santa Clara, Calif.

[73] Assignee: Canon Kabushiki Kaisha, Tokyo, Japan

[21] Appl. No.: 879,894

[22] Filed: Jun. 20, 1997

Related U.S. Application Data

[63] Continuation of Ser. No. 402,493, Mar. 13, 1995, abandoned.

[30]  Foreign Application Priority Data

Mar. 11, 1994 [AU] Australia .................................. PM4404

[51] Int. Cl.$^6$ ........................................................ G09G 5/10
[52] U.S. Cl. .............................. 345/149; 345/43; 345/89; 345/147
[58] Field of Search .................................... 345/147, 149, 345/87, 89, 100, 103, 43, 50, 63, 64, 67, 76, 84; 349/77, 78, 79, 84, 85

[56]  References Cited

U.S. PATENT DOCUMENTS

| | | | |
|---|---|---|---|
| 4,661,809 | 4/1987 | Anderson et al. | 345/149 |
| 4,745,406 | 5/1988 | Hayashi et al. | 345/89 |
| 4,902,103 | 2/1990 | Miyake et al. | 350/336 |
| 5,124,695 | 6/1992 | Green | 345/149 |
| 5,563,621 | 10/1996 | Silsby | 345/43 |

FOREIGN PATENT DOCUMENTS

| | | |
|---|---|---|
| 0361981 | 4/1990 | European Pat. Off. . |
| 2217088 | 10/1989 | United Kingdom . |
| 9310639 | 5/1993 | WIPO . |

OTHER PUBLICATIONS

Patent Abstracts of Japan, vol. 014, No. 230, (P–1048), May 16, 1990 & JP–A–02 056523 (Fujitsu Ltd) Feb. 26, 1990.

*Primary Examiner*—Xiao Wu
*Attorney, Agent, or Firm*—Fitzpatrick, Cella, Harper & Scinto

[57]  ABSTRACT

The design of a single pixel in a discrete level display is replicated a large number of times, often over a million times. The design of the pixel arrangement has substantial consequences in the quality of any image reproduced utilizing the pixel arrangement. In reducing unwanted artifacts, many factors must be considered. The present invention discloses a superior form of pixel arrangement for a discrete level display having optically balanced properties in addition to an intermingling of illumination areas at higher intensities and an irregular format of illumination.

24 Claims, 9 Drawing Sheets

LEVEL 0

LEVEL 1

LEVEL 2

LEVEL 3

LEVEL 4

LEVEL 5

LEVEL 6

LEVEL 7

LEVEL 8

LEVEL 9

LEVEL 10

LEVEL 11

LEVEL 12

LEVEL 13

LEVEL 14

LEVEL 15

INTERMINGLING SUBPIXELS IN DISCRETE LEVEL DISPLAYS

This application is a continuation of application Ser. No. 08/402,493 filed on Mar. 13, 1995, now abandoned.

BACKGROUND OF THE INVENTION

The present invention relates to the display of images on discrete level displays in which each pixel of the display has a number of sub pixel areas which can be independently illuminated so as to create multiple different possible levels of illumination of a single pixel.

UK Patent Application No. GB A 2,217,088A (Nixon|English Electric Valve Company Limited) and U.S. Pat. No. 5,124,695 (Green/Thorn EMI) disclose a monochrome discrete level display adapted to display a grey scale in which each pixel is formed from four separately energisable areas which have relative light intensity outputs in the ratio of 1:2:4:8 respectively. Each of the separately energisable subpixel areas has a number of sub components, which are spaced apart and concentrically arranged, in order that, irrespective of which subpixels are illuminated, the average "optical centre of illumination" remains substantially unchanged.

Although the concentric arrangement of subpixel areas leads to an improved result, U.S. Pat. No. 5,124,695 fails to recognise a number of other significant factors which influence how an image appears on a discrete level display and in turn influences the corresponding arrangement of a single pixel of said display.

Firstly, while it is recognised that the eye is sensitive to small errors in apparent pixel position perceived as a result of movement of the optical centre of illumination, this sensitivity is more significant when intense or bright light sources are moved from an ideal position as compared with weak or dull light sources. Therefore, a new, and additional, consideration in the construction of a single pixel arrangement recognised in arriving at the present invention, is the possible intensity of the light which will undergo a positional shift.

Secondly, with a pixel being made up of a number of subpixel illumination areas, surrounding or neighbouring pixels interfere with the illumination areas of a current pixel so as to cause unwanted artifacts, particularly perceptible to the eye, when certain images are displayed. The more luminous the image to be displayed, the more noticeable are the artifacts which are visible on a discrete level display. It is thought that with less illuminable images, only a minor portion of the overall area of each pixel is illuminated, and hence the opportunities for pixel interference effects to occur are substantially limited.

European Patent Application No. 361981 (Nakagawa/Sharp) discloses a number of pixel arrangements. One of those arrangements, as illustrated in FIG. 10 of Sharp discloses an arrangement that is substantially optically balanced for increasing levels of pixel output. Unfortunately, the arrangement disclosed has substantial regularity about it which again can lead to substantial artifacts occuring in images utilising the pixel arrangement of FIG. 10 of Sharp. For example, an area of an image comprising pixels at level 4 would consist of a series of lines which will be of greater distraction to the viewer. FIG. 10 of the Sharp application also illustrates a pixel arrangement which undergoes substantial alteration of the areas of illumination at certain levels. For example, from the level 8 to the level 9, Such a pixel arrangement is unsuitable to utilise in practice.

SUMMARY OF THE INVENTION

It is an object of the present invention to provide a method for determining an improved pixel layout over and above that disclosed as above.

According to one aspect of the present invention there is disclosed a pixel layout design for a discrete level display comprising a multiplicity of pixels, said pixels adapted to display a multiplicity of discrete levels of increasing intensity by means of a corresponding series of independently illuminable areas, wherein the illuminable areas of the more intense members of said series are interfused amongst one another.

According to a second aspect of the present invention, there is disclosed a method of laying out a discrete level pixel arrangement wherein each pixel comprises a series of independently illuminable areas of increasing intensity, said method comprising, providing an interfused arrangement of the more intense members of said series.

BRIEF DESCRIPTION OF THE FIGURES

A number of embodiments of the present invention will now be described with reference to the following drawings in which.

DETAILED DESCRIPTION OF THE PREFERRED EMBODIMENTS

Figure 1:
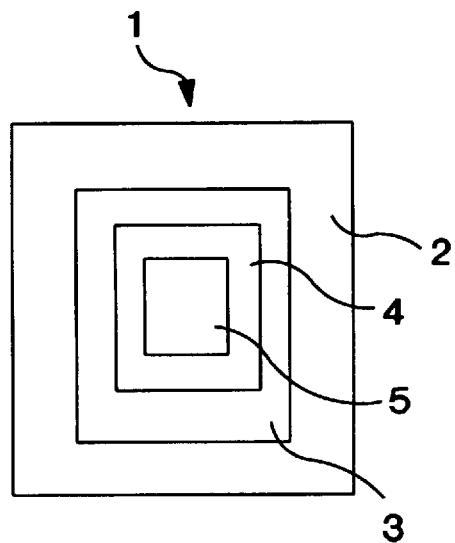
FIG. 1 illustrates a simplified representation of a pixel of a display device constructed in accordance with the art disclosed in U.K. Patent Application No. GB-A20 2,217, 088A.
Figure 2:
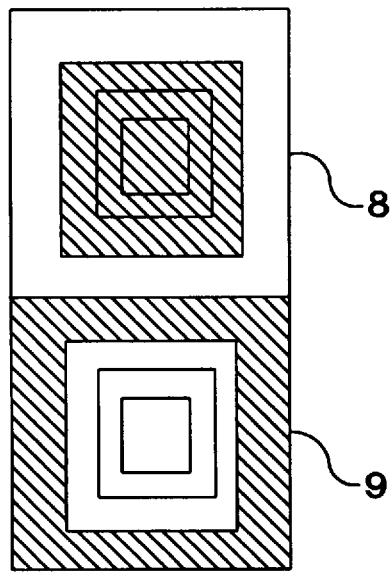
FIG. 2 illustrates two pixels, as set out in FIG. 1, Illuminating at levels 7 and 8.

Referring now to FIG. 1, there is shown a configuration of a pixel 1 which is equivalent to that disclosed in UK Patent Application 2,217,088A (English Electric Valve Companies Limited/Nixon), in addition to being the ideal pixel arrangement as discussed in relation to FIG. 1 of U.S. Pat. No. 5,124,695. This pixel arrangement 1 includes independently illuminable areas 2–5, the ratios of the surface areas of which form a binary relationship. Referring now to FIG. 2 there are shown two pixels 8, 9 with the pixel 8 having its outer boarder area (2 of FIG. 1) illuminated for a corresponding intensity level of 8 units and, pixel 9 has its inner three areas (3, 4, 5 of FIG. 1) illuminated, thereby giving an intensity level of 7 units.

As can be seen from FIG. 2, those portions of the pixels 8, 9 which are illuminated have substantially the same optical centre or illumination point for each pixel. This is a consequence of the illumination areas being substantially symmetrical and concentrically arranged around the centre point of the pixel.

Importantly, those areas of the pixel 8 which are illuminating at level 7 are substantially different from those areas of the pixel which are illuminating at level 8. Hence, it can be said that there is a large spatial variance of the portions of the pixel illuminating at level 7 as opposed to level 8. This large spatial variance, at the more intense levels of illumination, has the propensity to produce unwanted artifacts when images, half-toned or otherwise, are displayed utilising such a pixel arrangement. Simulations of continuous tone monochrome images utilising such a pixel arrangement were found to produce noticeable unwanted artifacts such as "blotches" on facial images and other noticeable distortions. This is thought to be due to the interaction of a pixel with its neighbouring pixels and the spatial variance of the illuminated portions of each pixel in relation to its neighbours. These artifacts were particularly noticeable in the more intense regions of an image and lead to the discarding of mere concentric arrangements as an ideal form of pixel.

Further investigation of different pixel arrangements by the present inventors lead to the conclusion the spatial variance is a significant problem at more intense levels of illumination and can be alleviated by reducing the nature of this variance. It is thought that the ideal pixel arrangement would be one where the intensity profile is of a Gaussian nature around the centre of the pixel for each possible pixel level. However, practical considerations make such an arrangement difficult to implement. Hence an approximation is preferably used.

In making the approximation, care must be taken so as not to introduce substantial symmetries or regularities in the pixel arrangement, for example, as illustrated by the Sharp arrangement, as these will lead to substantial unwanted artifacts in images reproduced by such a pixel arrangement.

The notion of spatial variance is not one that is easy to define. An analogy to decreasing spatial variance is the difference between a "checked" fabric pattern as compared with a "tweed" fabric pattern, This difference will become more readily apparent with reference to the following example.

Figure 3:
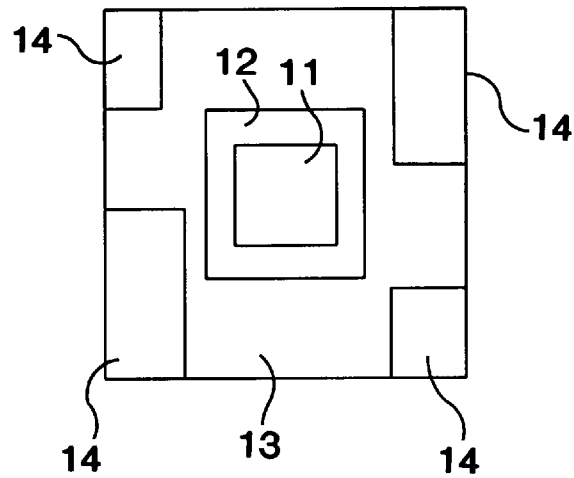
FIG. 3 illustrates a pixel arrangement in accordance with an instructive embodiment of the present invention.

Referring now to FIG. 3, there is shown a pixel arrangement in accordance with an instructive embodiment of the present invention which has a higher intermingling at higher output levels of the pixel. The lower illumination intensity levels 11, 12 are concentrically arranged as in the prior art. The levels of greater intensity 13, 14 are still substantially concentrically arranged around the centre of the pixel. However, levels 13 and 14 are interspersed one amongst the another.

Figure 4:
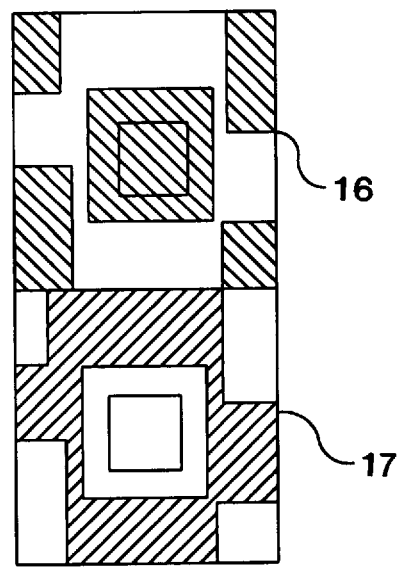
FIG. 4 illustrates two pixels constructed in accordance with the arrangement of FIG. 3 illuminating at levels 7 and 8 respectively.

Referring now to FIG. 4, there are shown two pixels 16, 17, each with the arrangement of FIG. 3 and with the pixel 16 showing an illumination level of 8 units and pixel 17 showing an illumination level of 7 units. It can be observed by comparison of FIG. 4 with FIG. 2 that those portions of the pixel which are illuminated are more dispersed or "spread out" over the pixel.

Figures 5, 6:
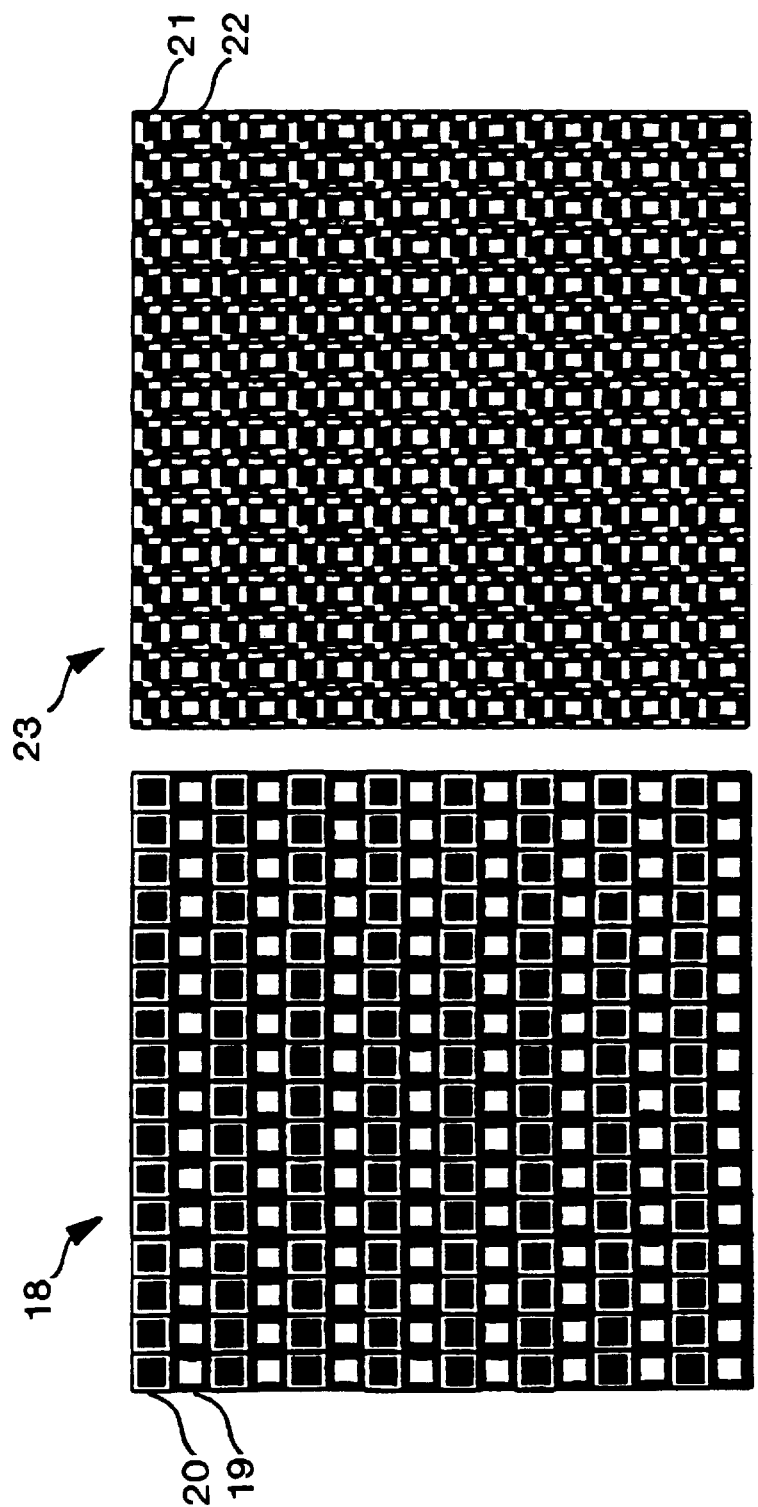
FIG. 5 illustrates an array of pixels with each pixel constructed in accordance with FIG. 1.
FIG. 6 illustrates an array of pixels with each pixel constructed in accordance with FIG. 3.

However, as seen in FIG. 5, there is shown a 16×16 array (18) of illuminating pixels constructed in accordance with the pixel layout of FIG. 1. This array consists of interleaved rows of pixels having illumination level 7 (19) and level 8 (20). As a consequence, the entire array 18 has an average illumination level of 0.5×(7+8)=7.5. This can be visualised as a mid shade of grey.

Similarly, as seen in FIG. 6, there is shown a 16×16 array (23) of pixels having a pixel layout as in FIGS. 3 and 4. The array 23 comprises interleaved rows of 8 level pixels (21) and rows of 7 level pixels (22) to again display a mid shade of grey at level 7.5. It is evident from a comparison of FIG. 6 with FIG. 5, that FIG. 6 provides an improved overall image which is more fine grained, less blotchy than, and better displays the same image as that attempted to be displayed by the array of FIG. 5.

Figures 7, 8:
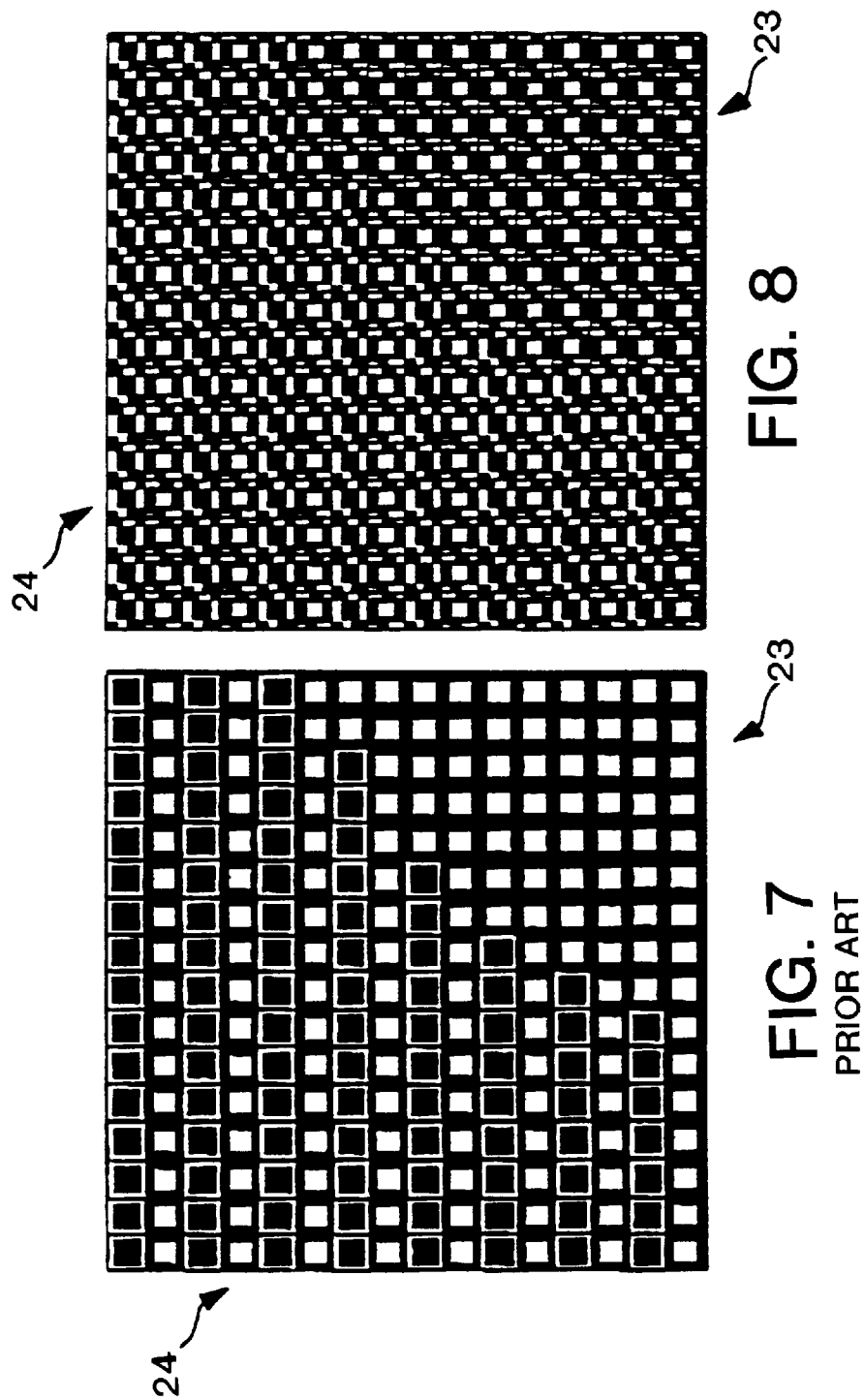
FIG. 7 illustrates another array of pixels with each pixel constructed in accordance with FIG. 1.
FIG. 8 illustrates another array of pixels with each pixel constructed in accordance with FIG. 3.

Tuning now to FIG. 7 and FIG. 8, there is shown a similar instructive embodiment, however, here the image to be displayed consists of a region of constant illumination in the lower right hand corner having a constant intensity of level 7 (23). In addition, the image to be displayed has a remaining region 24 having a region of intensity values averaging 7.5 (ie. alternating between 7 and 8). It can be seen from a comparison of FIG. 7 and FIG. 8, that FIG. 8 presents an improved overall image with the border between the two areas 23 and 24 in FIG. 7 being less noticeable in FIG. 8. That is, in FIG. 7, the perceived difference in illumination intensity between the two regions 23, 24 is much greater than the actual difference in illumination intensity.

A first practical embodiment of the present invention will now be described in relation to a bi-stable ferroelectric liquid crystal display arrangement. A ferroelectric liquid crystal device normally comprises a ferroelectric substance which is sandwiched between two substrates. On the substrates are placed a number of transparent electrodes which between them set up a number of electric fields in each pixel. The ferroelectric substance has a birefringent response to light passing through the ferroelectric depending on the alignment of the ferroelectric liquid crystals with the electric field influencing the crystals. The electrode structures are normally formed on the glass substrates by means of semiconductor processing techniques.

Ferroelectric liquid crystals have a hysteresis property in that when the electric field exceeds a predetermined magnitude, the crystals will align in a first birefringent state and will remain in that birefringent state until an electric field, greater than a predetermined magnitude, in the opposite direction is applied whereupon the crystals switch to an alternate birefringent state. Therefore, in order to drive a single pixel, a voltage differential is created across the substrates by driving a common indium tin oxide (ITO) layer to a first voltage and a requisite data drive line to a second voltage such that the requisite electric field is created across the substrates. Importantly, the birefringent state of neighbouring or adjacent pixels will be substantially unaffected. Generally liquid crystal displays drive a full line of pixels simultaneously setting all the pixels on a single line to their requisite states.

Figure 9:
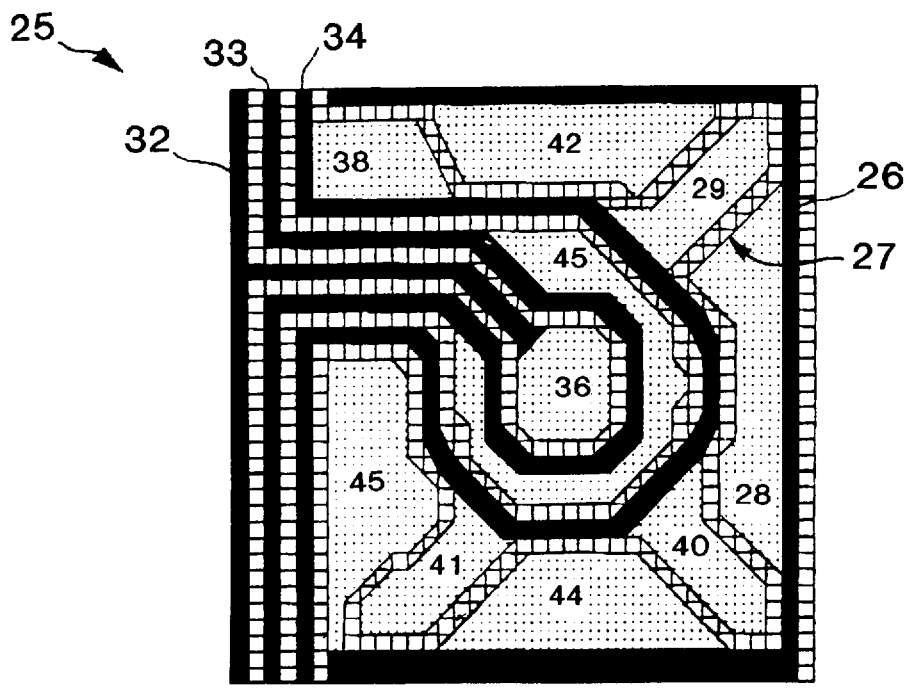
FIG. 9 illustrates a pixel arrangement of a first practical embodiment of the present invention.

The construction of a display in accordance with the first practical embodiment involves the replication of a single pixel a large number of times. The process of construction involves complicated processing techniques which, in the art, are constantly in a state of advancement and alteration, The first practical embodiment is constructed in accordance with advanced semiconductor processing techniques and in order to simplify discussion certain design rules will be assumed to be required to be met in order to construct a working display. These design rules are set out, with reference to the first practical embodiment as shown in FIG. 9, as follows, The display comprises a number of pixels, each of which have the layout of the pixel 25. This layout includes a number of metal lines eg. 26 for the supply of voltages to attached transparent electrode areas e.g. 28. The metal lines 26 are presumed to be of a predetermined thickness (in this case 10 $\mu$m), the thickness being in the large part determined by the fabrication process. Additionally, the space or insulation gap 27 between subpixel areas belonging to one level (28) and those belonging to an adjacent level (29) is presumed to be in the order of at least 10 $\mu$m wide. A 10 $\mu$m reference grid 30 has been superimposed behind the pixel arrangement so as to clarify the consequence of these design rules. It is further assumed that a 4 bit binary weighted pixel arrangement is required.

Figure 10:
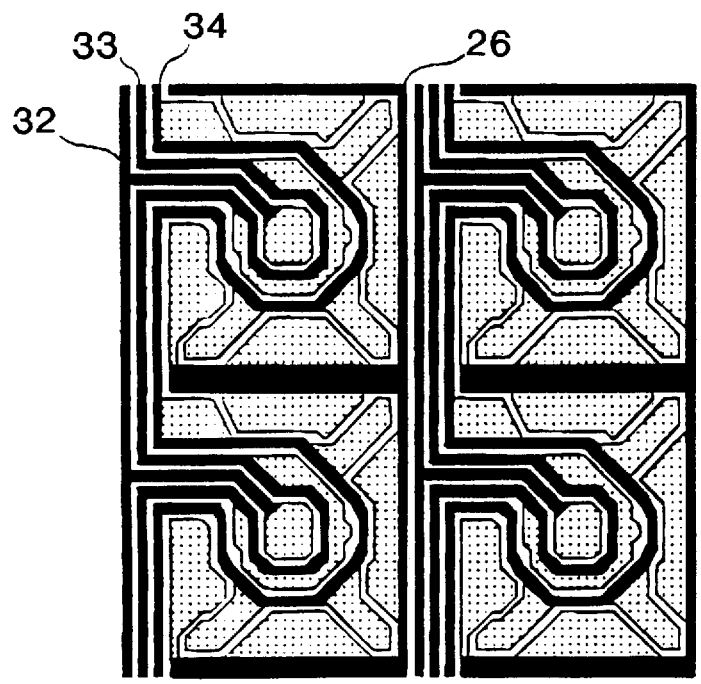
FIG. 10 illustrates a two-by-two array of pixels constructed in accordance with the first practical embodiment.

The top substrate includes four metal drive lines 32, 33, 34 and 26. The metal drive line 32 is used to control transparent electrode area 36 which comprises 1 square unit of electrode area. Metal line 33 controls transparent electrode area 45 which comprises 2 square units of transparent electrode area. Metal electrode 34 controls transparent electrode areas 38, 29, 40 and 41 which together comprise 4 square units of electrode area. Metal electrode 26 controls transparent electrode areas 42, 28, 44 and 45 which together form a transparent electrode area of 8 square units In FIG. 10, there is shown an array of four pixels each of the design of FIG. 9. It should be noted that the drive lines have symmetric entry and exit points from each pixel so that, for example, all drive lines 32 control corresponding areas of each pixel as do drive lines 33, 34 and 26.

Figure 11:
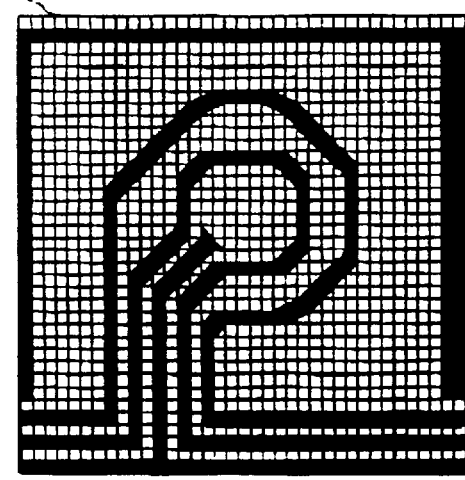
FIG. 11 illustrates the data metal layer of the first practical embodiment.

Referring now to FIG. 11, there is shown the data metal drive line mask 37 which is formed in the usual manner on the top substrate and normally comprises aluminium or molybdenum as is normal in the art. Subsequently, the transparent electrode layer is laid down on the top substrate. The transparent electrode layer is normally formed from Indium Tin Oxide (ITO) and is patterned as shown in FIG. 12 so as to be connected to corresponding portions of the metal layer as shown in FIG. 11.

Figure 13:
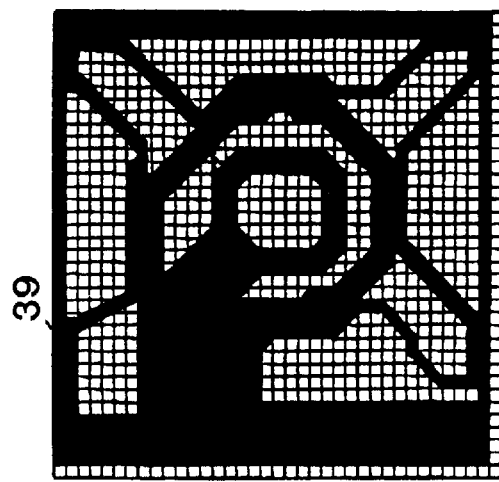
FIG. 13 illustrates the contrast enhancement layer of the first practical embodiment.
Figure 12:
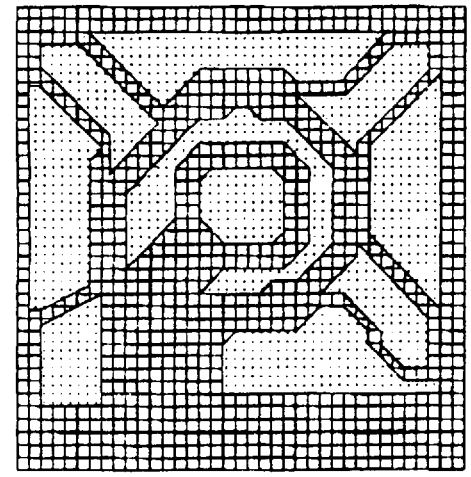
FIG. 12 illustrates the transparent data electrode layer of the first practical embodiment.

Unfortunately, only those areas covered by the transparent electrodes as shown in FIG. 12 will have the required electric fields set up between the top and bottom substrate. Therefore light shining through areas of the top substrate not comprising a transparent electrode will be uncontrolled and of an indeterminate intensity. In order to block this light from passing through the panel, a transparent insulating layer comprising two microns of $SiO_2$ is laid down over the data metal layer and the transparent electrode layer. On top of this insulating layer is placed an opaque metal layer 39 patterned as shown in FIG. 13. This metal layer is designed to block light coming through those portions of the display which are not under the control of transparent electrode areas.

Figure 15:
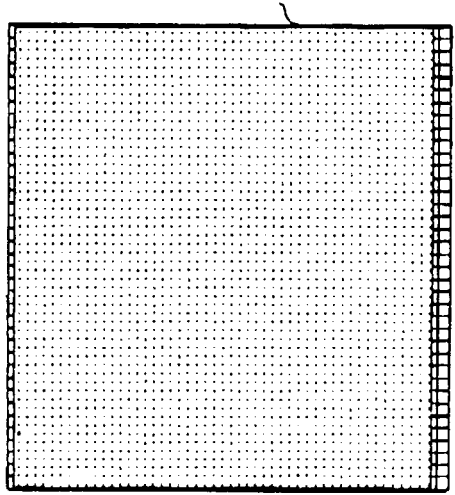
FIG. 15 illustrates the common level transparent layer of the first practical embodiment.
Figure 14:
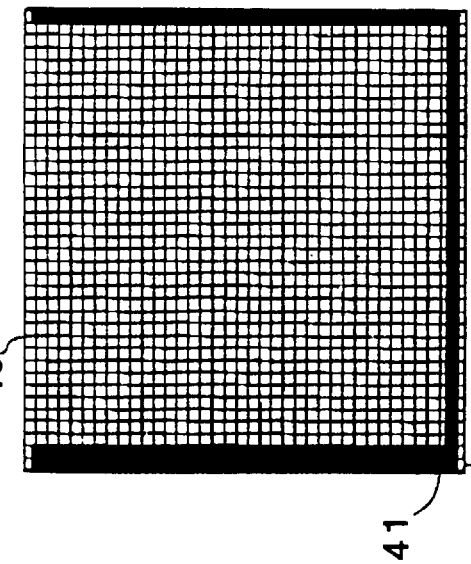
FIG. 14 illustrates the common level metal layer of the first practical embodiment.

Referring again to FIG. 10, it will be evident, that each data electrode (eg. 32) activates the electrode areas of a full column of pixels. As seen in FIG. 14 and FIG. 15, a common electrode layer is laid out substantially perpendicular to the data electrode layer and is formed on a row by row basis as is common in the art. Each row consists of common metal supply rails for the supply of voltages to each individual pixel in addition to a transparent electrode area for activation of each pixel. In FIG. 14, there is shown the common metal supply rails 41 for an individual pixel, and FIG. 15 shows the transparent electrode area 42 for each individual pixel.

It should be noted that the use of an opaque contrast enhancement layer as shown in FIG. 13 will result in a substantial consequential dimming of the final image 39. Unfortunately, the relevant design rules chosen for manufacture of this display have resulted in a substantial proportion of the pixel area being blocked by the opaque metal contrast enhancement layer 39. Further, the contrast enhancement layer 39 is electrically isolated on a pixel by pixel basis by means of a border 43. Of course, the light is unable to pass through the border 43 as it is blocked by the data metal layer 37 of FIG. 11 and the common metal layer 41 of FIG. 14. Similarly, the data metal pixel arrangement of FIG. 11 is electrically isolated from adjacent rows by means of a border 44. The common metal layer of FIG. 14 is electrically isolated on a column by column basis by means of two border regions 45, 46.

Figure 16:
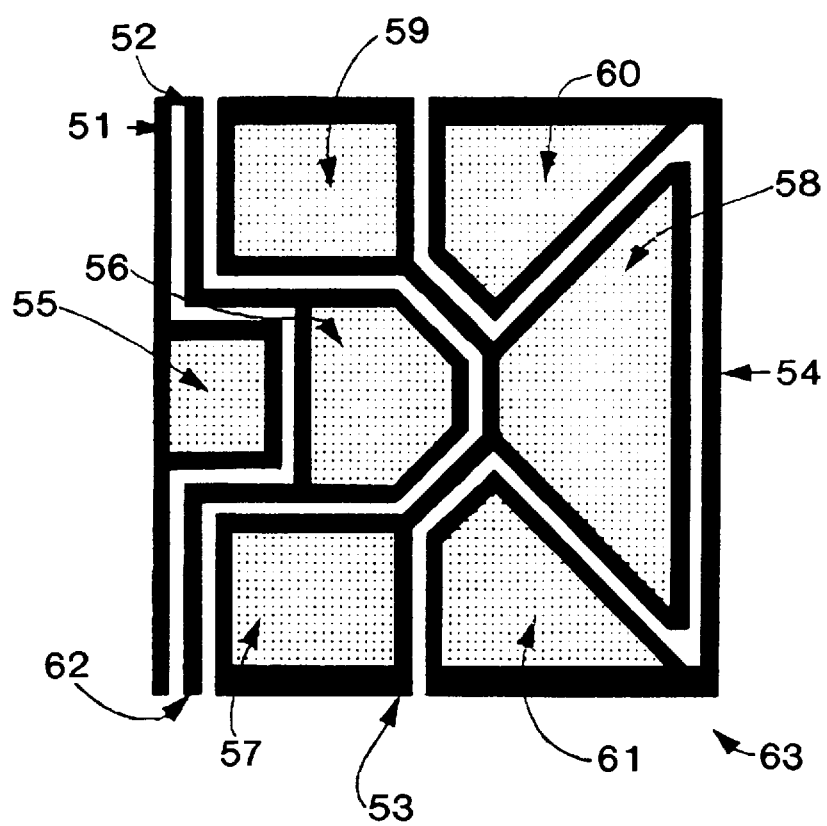
FIG. 16 illustrates a second practical embodiment of the present invention.

Referring now to FIG. 16, there is shown a second practical embodiment having the properties of reduced spatial variance at increased levels of intensity. This arrangement also has four drive lines 51–54 and hence four areas that can be independently driven. Drive line 51 is connected to and drives transparent electrode area 55, which is approximately 1 square unit in area. Drive line 52 drives transparent electrode area 56 which is approximately 2 square units in area. Drive line 53 drives transparent electrode areas 59, 58 and 57 which together form a transparent area of approximately 8 square units. Drive line 54 drives electrode areas 60, 61 which together are approximately 4 square units in area. Referring now to FIG. 15, there is shown the 16 possible levels available when driving all different permutations of the drive lines.

Figure 17:
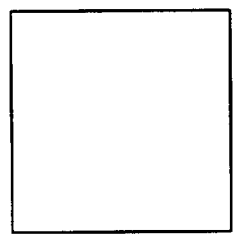
FIG. 17 illustrates the number of different levels available with the second practical embodiment of the present invention.
Figure 17:
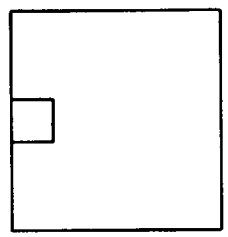
Figure 17:
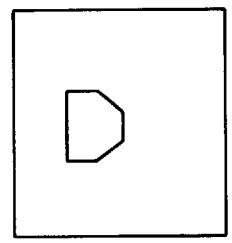
Figure 17:
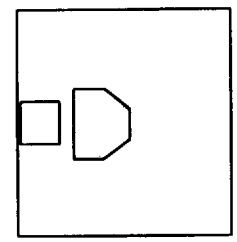
Figure 17:
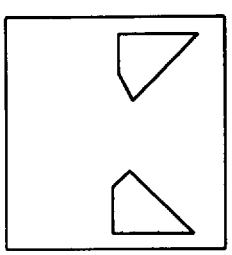
Figure 17:
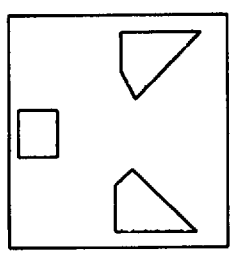
Figure 17:
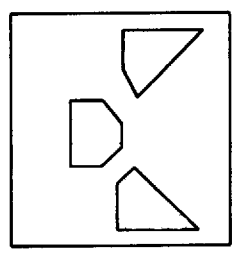
Figure 17:
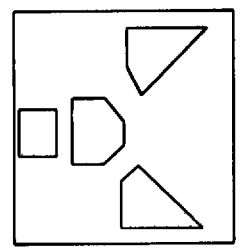
Figure 17:
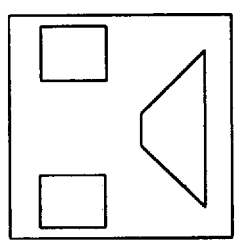
Figure 17:
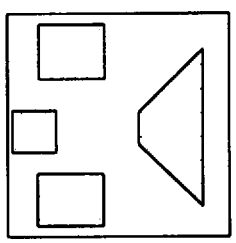
Figure 17:
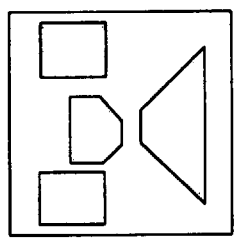
Figure 17:
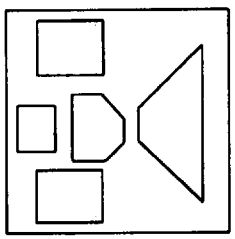
Figure 17:
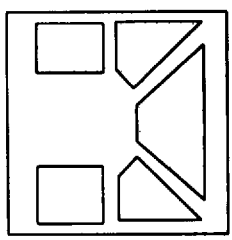
Figure 17:
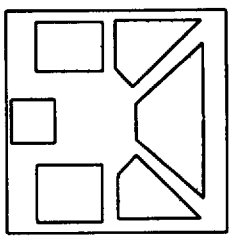
Figure 17:
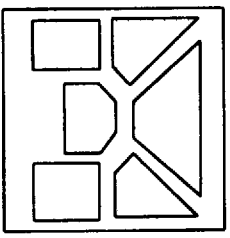
Figure 17:
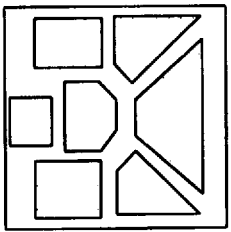

A number of aspects of the pixel arrangement of FIGS. 16 and 17 should be noted. These include the fact that the lower pixel levels do not have concentrically arranged pixel areas. As mentioned previously, the need to arrange pixels concentrically is of greater significance with more intense level pixels. It has been surprisingly found that the movement of the centre of illumination of lower levels of illumination does not cause substantial artifacts to appear in most images. It should be further noted that the 8 level transparent area (57, 58, 59) and the 4 level transparent area (60, 61) are interspersed or intermingled, in addition to having substantially the same centre of illuminosity.

Figure 18:
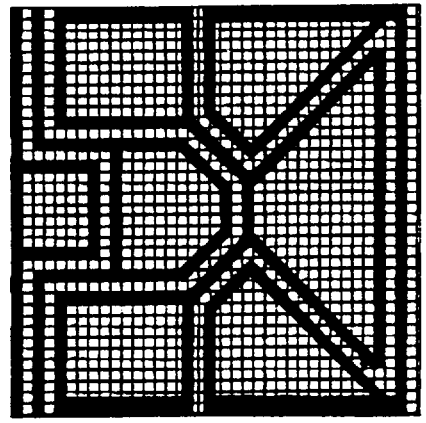
FIG. 18 illustrates the data metal layer of the second practical embodiment.
Figure 19:
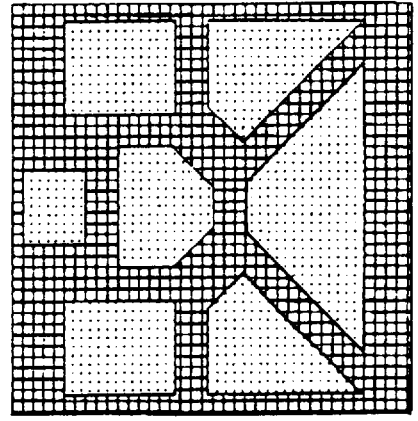
FIG. 19 illustrates the transparent electrode layer of the second practical embodiment.
Figure 20:
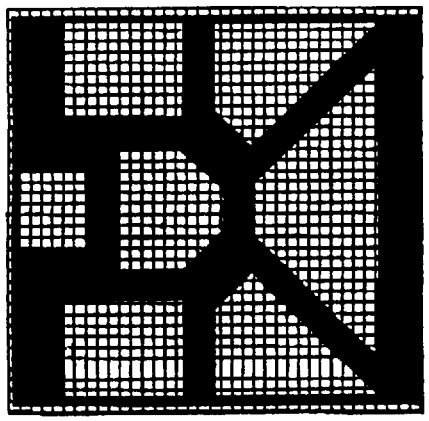
FIG. 20 illustrates the common metal layer of the second practical embodiment.
Figure 21:
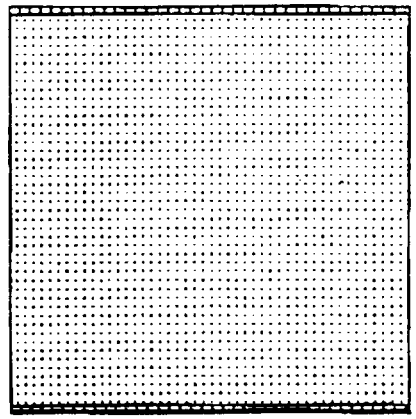
FIG. 21 illustrates the common level transparent layer of the second practical embodiment.

FIG. 18 shows the corresponding data metal layer for the pixel arrangement of FIG. 16. FIG. 19 shows the corresponding data level transparent electrode layer for the arrangement of FIG. 16. FIG. 20 shows the metal layer of the common electrode layer and FIG. 21 illustrates the transparent common electrode layer. Together these drawings illustrate the internal arrangement of the pixel.

Figure 22:
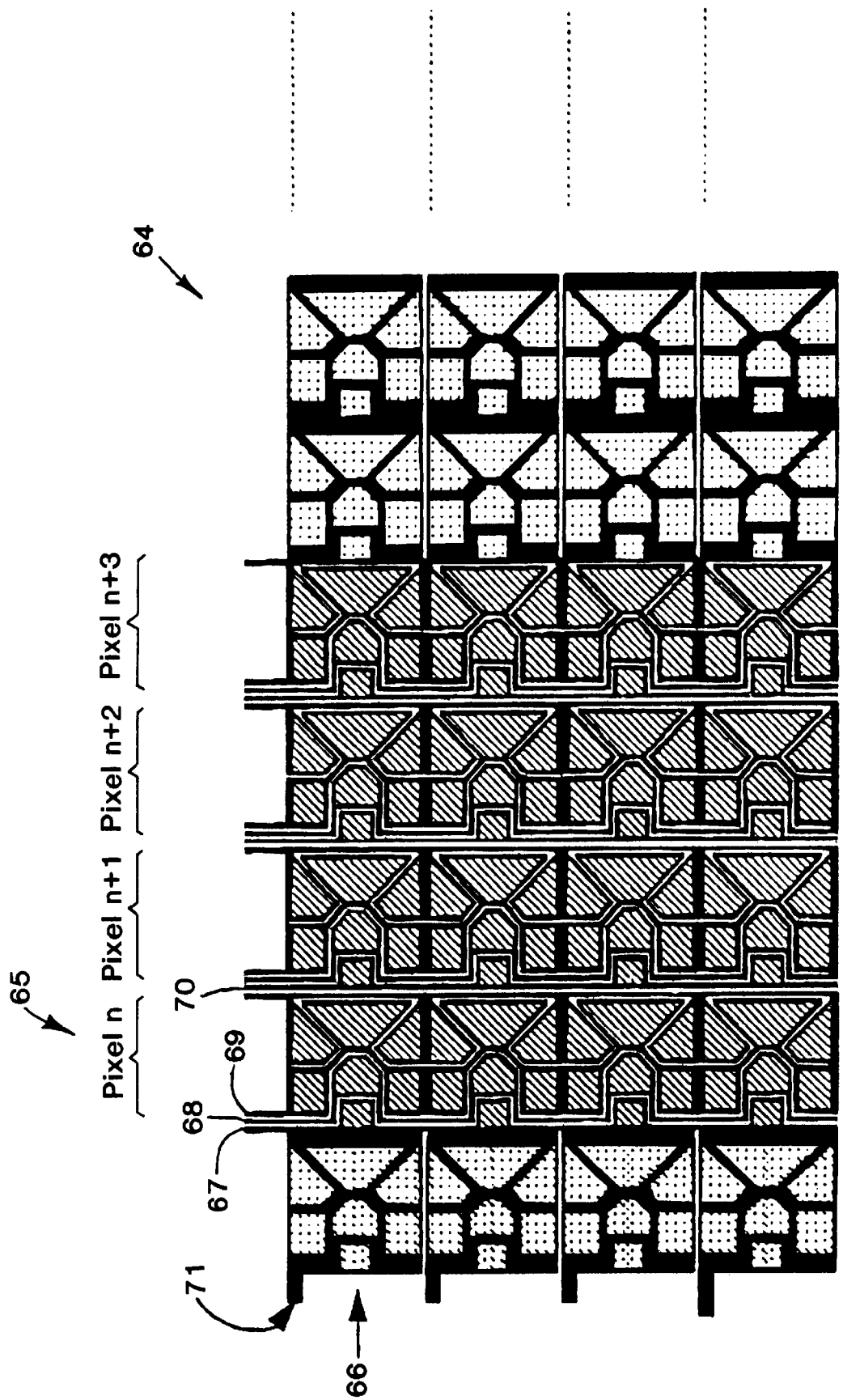
FIG. 22 illustrates an array of pixels, partially in section, constructed in accordance with the second practical embodiment.

Turning now to FIG. 22 there is shown a portion of a panel 64, partly in section, incorporating pixels constructed in accordance with the second practical embodiment, but having part of the upper layers cut away. The construction consists of a number of pixel columns 65 constructed in a regular pattern with the actual number of columns corresponding to the desired number of columns in the overall panel. Additionally, there is constructed a number of common lines 66, one for each line of the panel or display.

Both the pixel data columns 65 and common lines 66 are made up of patterns formed from two conductive substances and are insulated from each other and from a ferro electric liquid crystal substance that is placed between them.

Each pixel column 65 contains a number of drive lines e.g. 67, 68, 69, 70 connected to the edge of the panel for driving different transparent portions of the pixel column. Additionally, each common line 66 is also provided with a connection to the end of the panel 71.

In order to set a particular row of pixels to particular individual values, the common line 66 can be driven low while all the drive lines of all the pixels on the line are also driven to their required values, thereby setting up the required electric field across the various transparent portions.

The foregoing describes only two embodiments of the present invention. Modifications obvious to those skilled in the art can be made thereto without departing from the scope of the present invention. In particular, altered layouts in accordance with different design rules would be obvious to those skilled in the art.

Similarly, further application of the above principles of the present invention to displays other than FLCD type displays, such as liquid crystal displays and plasma type displays, would be readily apparent to those skilled in the art.

What we claim is:

1. A pixel layout arrangement for a discrete level display, said arrangement comprising a multiplicity of pixels, each said pixel comprising a plurality of independently illuminable areas each adapted to display a respective one of a multiplicity of discrete illumination levels, each said illuminable area being a member of a group of like intensity, said intensity being substantially proportional to the size of each said illuminable areas, each said pixel having at least three of said groups wherein at least one of the more intense ones of said groups has a plurality of said illuminable areas, and the illuminable areas of said one group are irregularly spaced apart and are substantially non-concentrically interspersed amongst the illuminable areas of at least one other of the more intense ones of said groups.

2. A pixel layout arrangement as claimed in claim 1, wherein said illuminable areas of at least the more intense ones of said groups have substantially the same centre of illumination.

3. A pixel layout arrangement as claimed in claim 2, wherein the illuminable areas of lower intensity ones of said group have substantially different centres of illumination.

4. A pixel layout as claimed in claim 1, wherein said independently illuminable areas are substantially asymmetrically arranged within the pixel.

5. A pixel layout arrangement as claimed in claim 1, wherein each said pixel comprises no more than one axis of symmetry with respect to the arrangement of said illuminable areas.

6. A pixel layout arrangement as claimed in claim 1, wherein at least one of the more intense ones of the groups comprises a plurality of said illuminable areas.

7. A method of laying out a discrete level pixel arrangement wherein each pixel of the arrangement comprises a plurality of independently illuminable areas, each illuminable area being a member of a group of illuminable areas of like intensity, there being at least three of the groups, said method comprising the steps of:

irregularly spacing about the pixel the illuminable areas of at least one of the more intense ones of the groups: and non-concentrically interspersing the irregularly spaced illuminable areas amongst illuminable areas of at least one other of the more intense ones of the groups.

8. A method of laying out a discrete level pixel arrangement as claimed in claim 7, further comprising the step of laying out the illuminable areas of said more intense ones of the groups to have substantially the same centre of illumination.

9. A method of laying out a discrete level pixel arrangement as claimed in claim 7 or 8, further comprising the step of laying out the illuminable areas of the less intense ones of the groups to have substantially different centres of illumination.

10. A method of laying out a discrete level pixel arrangement as claimed in claim 7 or 8, further comprising the step of laying out the illuminable areas asymmetrically.

11. A pixel layout arrangement for a discrete level display, said display comprising a multiplicity of pixels, each of said pixels having a plurality of independently illuminable areas configured to permit said pixel to display a multiplicity of discrete illumination levels each of increasing intensity by enabling predetermined combinations of one or more of said areas, whereby certain ones of said areas corresponding to those enabled in at least a plurality of the more intense combinations are irregularly spaced amongst one another and non-concentrically intermingled with other ones of said areas enabled in at least the more intense combinations.

12. A liquid crystal display having a pixel layout arrangement, said arrangement comprising a multiplicity of pixels, each said pixel comprising a plurality of independently illuminable areas each adapted to display one of a multiplicity of discrete illumination levels, each said illuminable area being a member of a group of areas of like intensity, each said pixel having at least three of said groups, wherein the illuminable areas of at least one of the more intense ones said groups are irregularly spaced and are non-concentrically interspersed among the illuminable areas of at least one other of the more intense ones of said groups.

13. A ferroelectric liquid crystal display having a pixel layout arrangement, said arrangement comprising a multiplicity of pixels, each said pixel comprising a plurality of independently illuminable areas each adapted to display one of a multiplicity of discrete illumination levels, each said illuminable area being a member of a group of areas of like intensity, each said pixel having at least three of said groups, wherein the illuminable areas of at last one of the more intense ones said groups are irregularly spaced and are non-concentrically interspersed among the illuminable area of at least one other of the more intense ones of said groups.

14. A plasma type display having a pixel layout arrangement, said arrangement comprising a multiplicity of pixels, each said pixel comprising a plurality of independently illuminable areas each adapted to display one of a multiplicity of discreet illumination levels, each said illuminable area being a member of a group of areas of like intensity, each said pixel having at least three of said groups, wherein the illuminable areas of at least one of the more intense ones of said groups are irregularly spaced and are non-concentrically interspersed among the illuminable areas of at least one other of the more intense ones of said groups.

15. A pixel layout arrangement for a discrete level display, said arrangement comprising a multiplicity of pixels, each said pixel comprising a plurality of independently illuminable areas each adapted to display a respective one of a multiplicity of discrete illumination levels, wherein at least one of the less intense ones of said illuminable areas is centrally located and concentrically arranged within at least one other of said less intense one of said illuminable areas, and wherein the more intense ones of said illuminable areas are interspersed one amongst another and are substantially concentrically arranged around a center of said pixel.

16. A pixel layout arrangement as claimed in claim 15, wherein the independently illuminable areas of at least one of said more intense ones are irregularly spaced apart from at least one other of the more intense ones of said illuminable areas.

17. A pixel layout arrangement as claimed in claim 16, wherein no two said illuminable areas are the same size.

18. A pixel layout arrangement as claimed in claim 15, wherein said pixel comprises no axis of symmetry with respect to the arrangement of said illuminable areas.

19. A pixel layout arrangement for a discrete level display, said arrangement comprising a multiplicity of pixels, each said pixel comprising a plurality of independently illuminable areas each adapted to display a respective one of a multiplicity of discrete illumination levels, wherein each illuminable area has a shape that is different from any other one of said illuminable areas, and wherein at least one of said illuminable areas is centrally located and concentrically arranged substantially within at least one other of said illuminable areas, and wherein said other illuminable areas are asymmetrically arranged around a center of said pixel.

20. A pixel layout arrangement as claimed in claim 19, wherein no two said illuminable areas are of the same size.

21. A pixel layout arrangement as claimed in claim 20, wherein said pixel comprises no axis of symmetry with respect to the arrangement of said illuminable areas.

22. A pixel layout arrangement as claimed in claim 20, wherein each said pixel has no more than two groups of areas of like intensity.

23. A pixel layout arrangement as claimed in claim 22, wherein each said pixel comprises no more than one axis of symmetry with respect to the arrangement of said illuminable areas.

24. A pixel layout arrangement for a discrete level display, said arrangement comprising a multiplicity of pixels, each said pixel comprising a plurality of independently illuminable areas each adapted to display a respective one of a multiplicity of discrete illumination levels, wherein at least one of said less intense ones of said illuminable areas is non-concentrically arranged with respect to at least one other of said less intense ones and wherein the more intense ones of said illuminable areas are non-concentrically interspersed and are arranged so as to partially surround at least one of the less intense ones of said illuminable areas.

* * * * *

UNITED STATES PATENT AND TRADEMARK OFFICE
CERTIFICATE OF CORRECTION

PATENT NO. : 5,805,136
DATED : September 8, 1998
INVENTOR(S) : KIA SILVERBROOK ET AL.

It is certified that error appears in the above-identified patent and that said Letters Patent is hereby corrected as shown below:

COLUMN 1

Line 14, "(Nixon|English" should read --(Nixon/English--.
    Line 66, "Such" should read --such--.

COLUMN 2

Line 27, "GB-A20" should read --GB-A--.

COLUMN 5

Line 24, "follows," should read --follows.--.

COLUMN 7

Line 47, "areas," should read --area,--.

UNITED STATES PATENT AND TRADEMARK OFFICE
CERTIFICATE OF CORRECTION

PATENT NO. : 5,805,136
DATED : September 8, 1998
INVENTOR(S) : KIA SILVERBROOK ET AL.

Page 2 of 2

It is certified that error appears in the above-identified patent and that said Letters Patent is hereby corrected as shown below:

<u>COLUMN 8</u>

Line 47, "ones" should read --ones of--.
Line 58, "ones" should read --ones of--.

Signed and Sealed this

Twenty-ninth Day of June, 1999

Attest:

Q. TODD DICKINSON

*Attesting Officer*      *Acting Commissioner of Patents and Trademarks*